United States Patent
Hsieh

(10) Patent No.: US 12,215,798 B2
(45) Date of Patent: Feb. 4, 2025

(54) SPRINKLER WATER FLOW SWITCHING DEVICE

(71) Applicant: Yuan Pin Industrial Co., Ltd., Ho-Mei Township, Chang-Hua County (TW)

(72) Inventor: Ming-Chih Hsieh, Ho-Mei Township (TW)

(73) Assignee: Yuan Pin Industrial Co., Ltd., Ho-Mei Township (TW)

( * ) Notice: Subject to any disclaimer, the term of this patent is extended or adjusted under 35 U.S.C. 154(b) by 425 days.

(21) Appl. No.: 17/876,667

(22) Filed: Jul. 29, 2022

(65) Prior Publication Data
US 2024/0035587 A1   Feb. 1, 2024

(51) Int. Cl.
*F16K 31/524* (2006.01)
*B05B 3/04* (2006.01)

(52) U.S. Cl.
CPC ...... *F16K 31/52441* (2013.01); *B05B 3/0431* (2013.01); *F16K 31/52416* (2013.01)

(58) Field of Classification Search
CPC ..... B05B 3/0431; B05B 3/0436; B05B 3/044; B05B 3/14; B05B 3/16; F16K 31/52416; F16K 31/52441
See application file for complete search history.

(56) References Cited

U.S. PATENT DOCUMENTS

| | | | | |
|---|---|---|---|---|
| 6,164,562 A * | 12/2000 | Wu | ....................... | B05B 3/0436 239/246 |
| 7,422,162 B2 * | 9/2008 | Wang | ....................... | B05B 3/044 239/242 |
| 8,636,228 B2 * | 1/2014 | Lo | ....................... | B05B 3/0422 239/222.13 |
| 8,746,592 B2 * | 6/2014 | Lo | ....................... | B05B 3/0436 239/113 |
| 9,016,597 B2 * | 4/2015 | Hsieh | ....................... | B05B 3/0431 239/242 |
| 9,700,910 B2 * | 7/2017 | Hung | ....................... | F16K 31/53 |
| 2008/0169026 A1 * | 7/2008 | Sanchez | ....................... | F16K 11/052 137/1 |
| 2009/0014553 A1 * | 1/2009 | Wang | ....................... | B05B 3/044 239/237 |
| 2019/0000023 A1 * | 1/2019 | Chen | ....................... | B05B 3/0436 |

FOREIGN PATENT DOCUMENTS

| | | | | |
|---|---|---|---|---|
| DE | 202012011208 U1 * | 2/2013 | ......... | B05B 3/0436 |
| DE | 202013005525 U1 * | 11/2013 | ......... | B05B 12/002 |
| EP | 0826427 A2 * | 3/1998 | ............ | B05B 3/044 |

* cited by examiner

*Primary Examiner* — Darren W Gorman
(74) *Attorney, Agent, or Firm* — Best & Flanagan LLP

(57) ABSTRACT

A sprinkler water flow switching device is assembled in a movable seat of the water sprinkler with a partition dividing into an impeller chamber and a gear chamber. The partition is provided with a first water channel and a second water channel for directing water from the gear chamber to the impeller chamber, so as to control the direction of rotation of the impeller in the impeller chamber. The water flow switching device includes a projection member, a seesaw plate and a driving lever in the gear chamber; the driving lever can oscillate and actuate the seesaw plate to move on the projection member, then the seesaw plate can move as a seesaw to selectively close the water inlet of the first water channel or the second water channel, thereby changing the rotation direction of the impeller and the water spray direction.

4 Claims, 17 Drawing Sheets

SPRINKLER WATER FLOW SWITCHING DEVICE

FIELD OF THE INVENTION

The present invention relates to a sprinkler for the gardening supplies.

BACKGROUND OF THE INVENTION

As shown in FIGS. 20 to 22, a sprinkler 90 of the previous art is driven by a sprinkler control unit 80, which can further control a sprinkler pipe 91 to generate a reciprocal oscillation. The sprinkler control unit 80 is connected to a water source (not shown) by a water inlet connector 92 at one end and with the sprinkler pipe 91 at the other end.

The above sprinkler control unit 80 includes a movable seat 81, an impeller 82, a gear assembly 83, and a water flow switching unit 84.

The said movable seat 81 has an impeller chamber 811, a gear chamber 812, an inlet hole 813 which enables the gear chamber 812 to communicate with the outside, an outlet hole 814 which enables the impeller chamber 811 to communicate with the outside, and a first water channel 815 and a second water channel 816 which are connected with both of the impeller chamber 811 and the gear chamber 812.

Said impeller 82 is pivoted in the impeller chamber 811, can be pushed by the water entering from the first water channel 815 or the second water channel 816, and rotates in different directions.

Said gear assembly 83 is pivoted in the gear chamber 811, it is driven by the impeller 82 and draws the movable seat 81 to rotate, further controlling the spraying water of the sprinkler pipe 91.

The water flow switching unit 84 includes an oscillating member 841 and a driving lever 842. The oscillating member 841 is pivoted in the gear chamber 812 and corresponds to the first water channel 815 and the second water channel 816. One end of the driving lever 842 extends out of the movable seat 81, and the other end is inserted into a slot 8411 which is formed in the oscillating member 841. By touching the end of the driving lever 842 that extends out of the movable seat 81, the driving lever 842 swings to toggle the oscillating member 841, causing the oscillating member 841 to move like a seesaw movement and selectively close the opening of the first water channel 815 or the second water channel 816, thereby changing the direction of water flow into the impeller chamber 811, and the rotation direction of the impeller 82 as well as the gear assembly 83, then the gear assembly 83 will actuate the movable seat 81 to change the direction of rotation, which in turn causes the sprinkler pipe 91 to change the direction of spraying. The structure of actuating the driving lever 842 can be found in EP0826427A2, column 3, lines 10 to 20, and FIG. 7.

Based on the above, the seesawing direction of the oscillating member 841 is subjected to change by applying an oscillating force on the wall of the slot 8411 formed in the oscillating member 841, through the driving lever 842. However, since the slot 8411 is configured at the center of the oscillating member 841, it is difficult to change the seesawing direction of the oscillating member 841 thereof.

SUMMARY OF THE INVENTION

The purpose of the present invention is to improve the above problems.

The technical features of the present invention are:

A sprinkler water flow switching device, which is assembled in a movable seat of a water sprinkler divided into an impeller chamber and a gear chamber by a partition, and the partition is provided with a first water channel and a second water channel for directing water from the gear chamber to the impeller chamber, so as to control the direction of rotation of the impeller in the impeller chamber. The water flow switching device includes a projection member, a seesaw plate and a driving lever in the gear chamber, the driving lever can oscillate and actuate the groove of the seesaw plate to move on the projection member, when a first side wall or a second side wall of the groove is leaned against a top end of the projection member, the top end of the projection member will be supported at the eccentric position of the seesaw plate, then the seesaw plate can move like a seesaw to selectively close the water inlet of the first water channel or the second water channel.

The effects of the present invention are:

When the driving lever is oscillated, the seesaw plate will be displaced by the movement of the driving lever, and will change the corresponding position with the top end of the projecting member, resulting in the change of the pivot point and the length of the lever arm in the principle of the lever, thus causing the seesaw plate to act as a seesaw.

In comparison with the driving lever, changing the direction of the seesaw plate is effortless, and the seesaw plate will seal the inlet section of one of the water channels tightly, which means that the inlet section of the other water channel will be completely open, and there will be no flow disturbance of the inlet sections for the first water channel and the second water channel that caused by a semi-opening status of two inlet sections at the same time.

DESCRIPTION OF THE PREFERRED EMBODIMENTS

In order to facilitate the illustration of the idea of the present invention expressed in the above-mentioned "Summary of the Invention", it is hereby expressed by specific embodiments. The various objects in the embodiments are depicted in the proportions, dimensions, deformations, or displacements applicable to the description, rather than in the proportions of the actual components, as indicated. The same and symmetrical configuration of the components in the remaining embodiments are represented by the same number. In addition, the directional terms in the description of each embodiment listed below are in accordance with the specified direction of the view, and cannot be used as an explanation of the restrictions of the invention.

Figure 1:
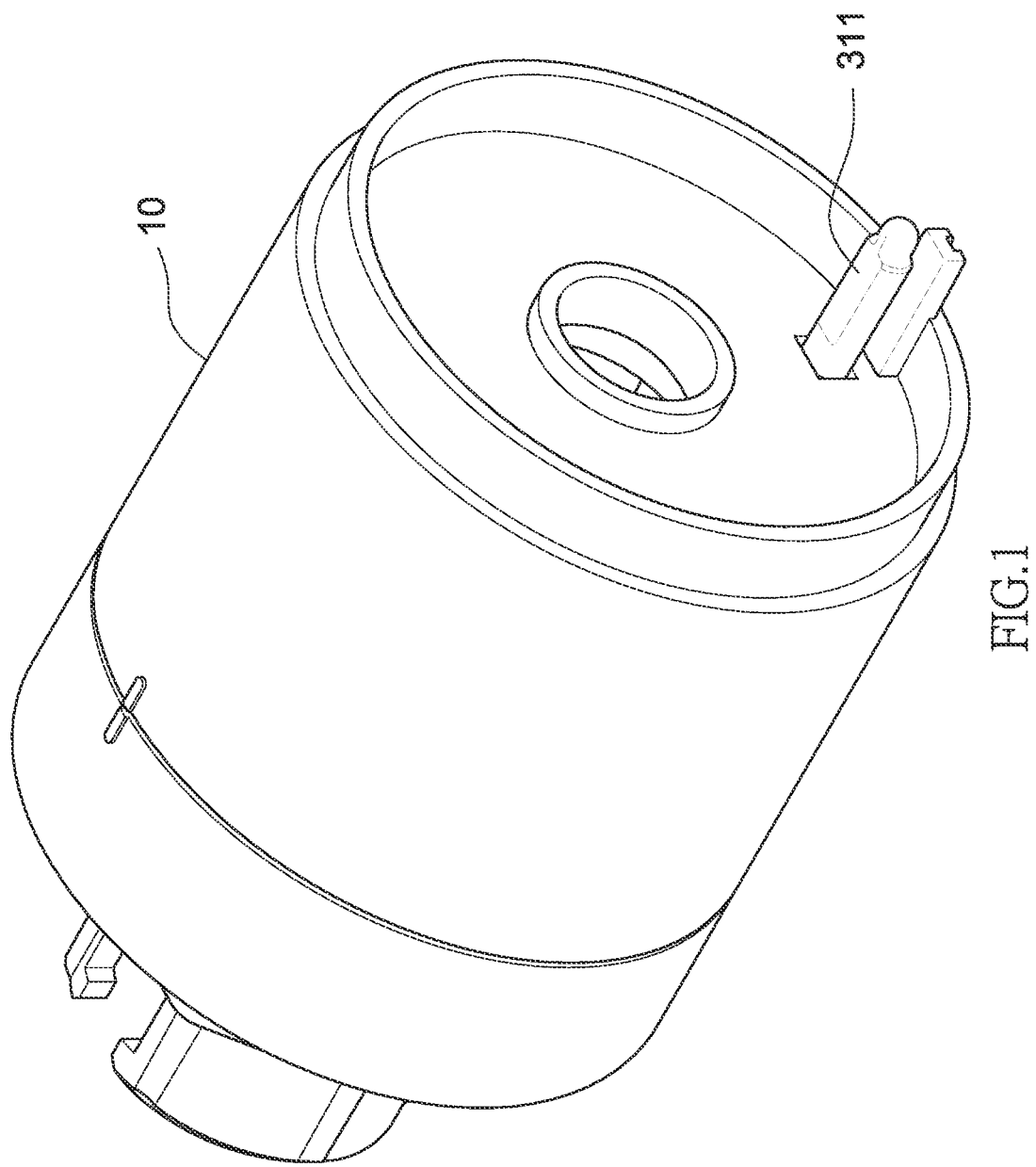
FIG. 1 is a perspective view schematically showing a sprinkler control unit of the present invention.
Figure 20:
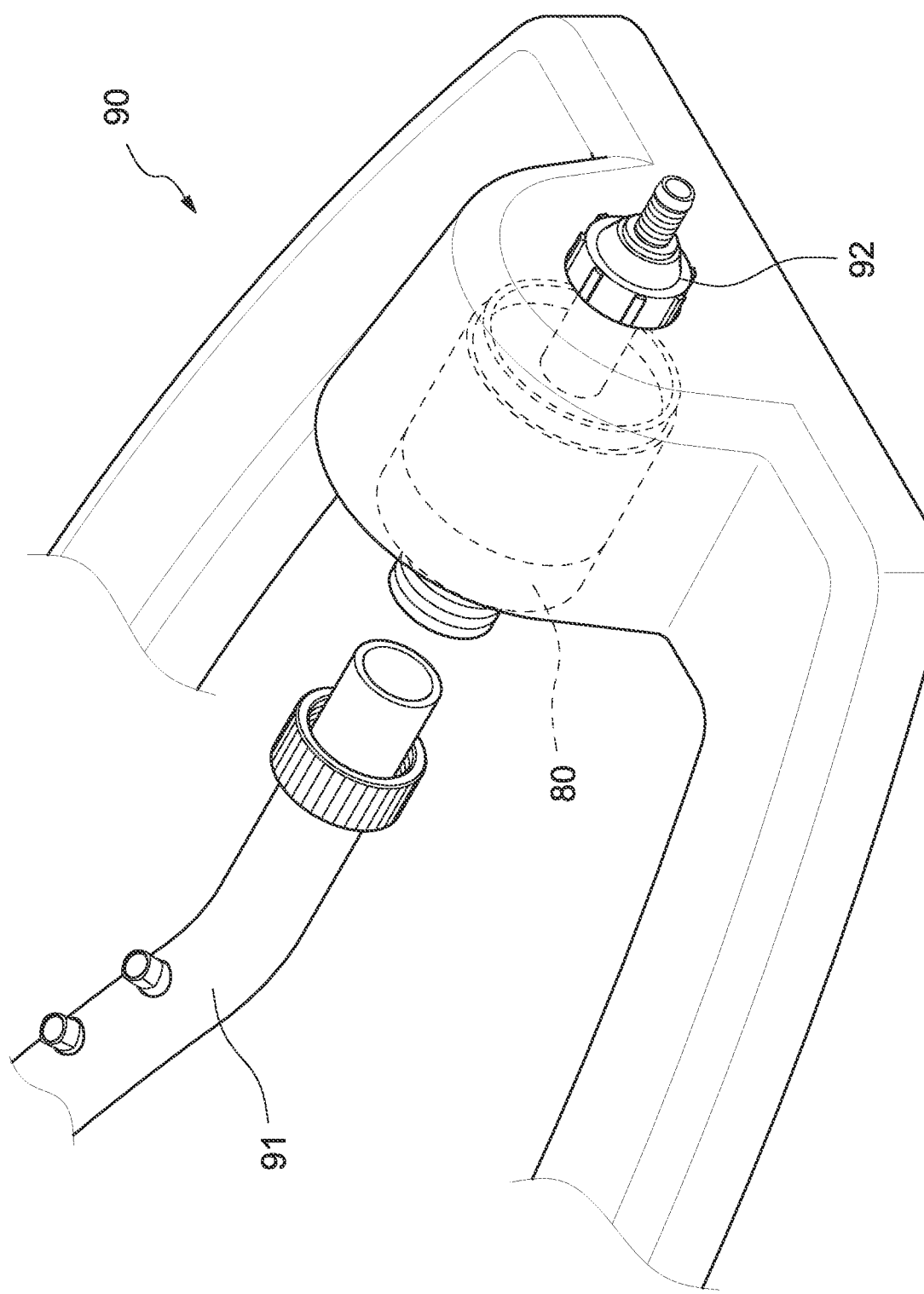
FIG. 20 is a partial cross-sectional view of the prior art.
Figure 21:
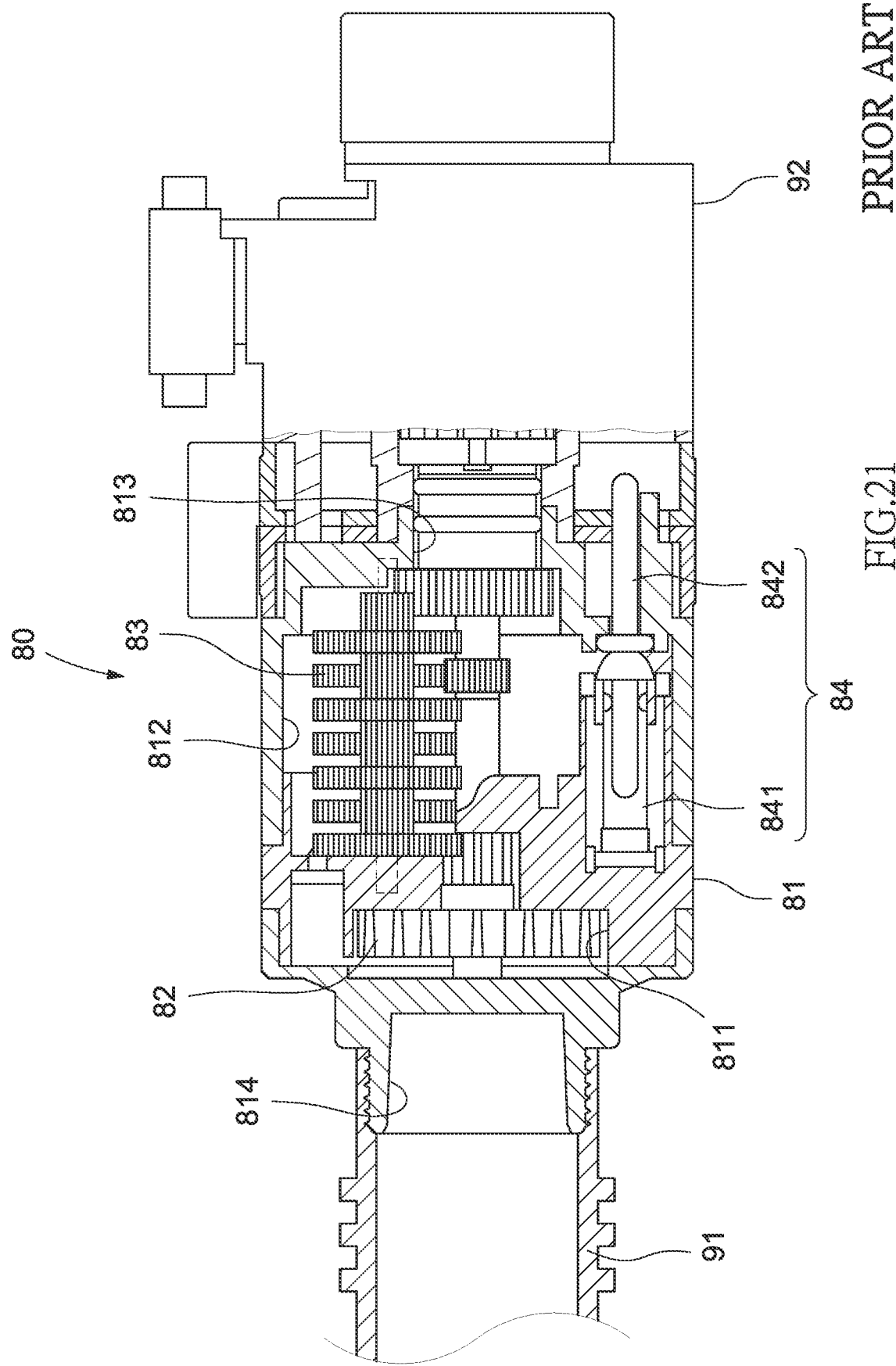
FIG. 21 is a partial member cross-sectional view of FIG. 20.
Figure 22:
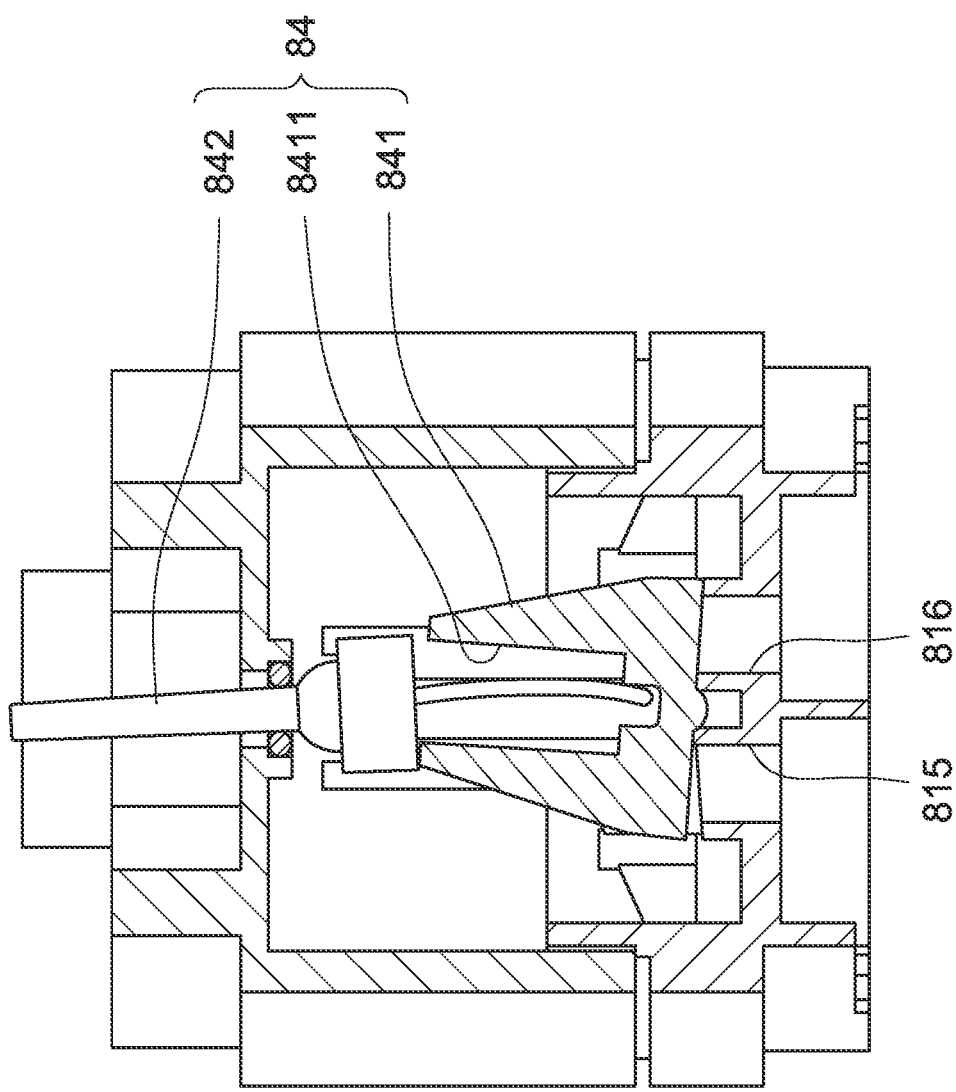
FIG. 22 is a cross-section and an operation schematic view of a partial member of FIG. 20.

The water flow switching device of the present invention is assembled in a movable seat 10 of a sprinkler control unit of a water sprinkler to switch the direction of the water flow. The movable seat 10 of the present invention is shown in FIG. 1, and the sprinkler and the sprinkler control unit are known as the prior art which can be referred to in FIGS. 20 to 22.

Figure 2:
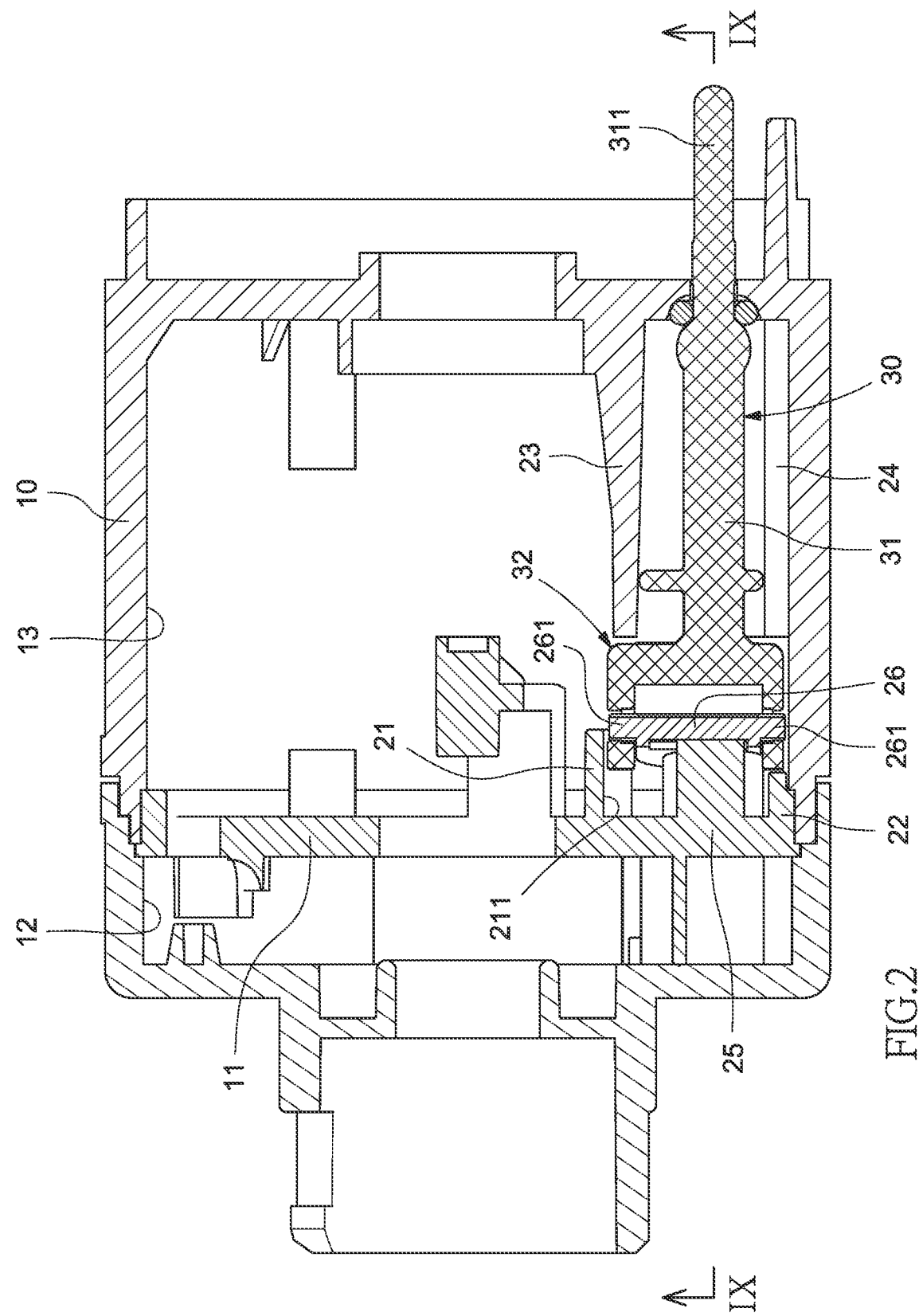
FIG. 2 is a schematic cross-sectional view taken along line II-II of FIG. 1.
Figure 3:
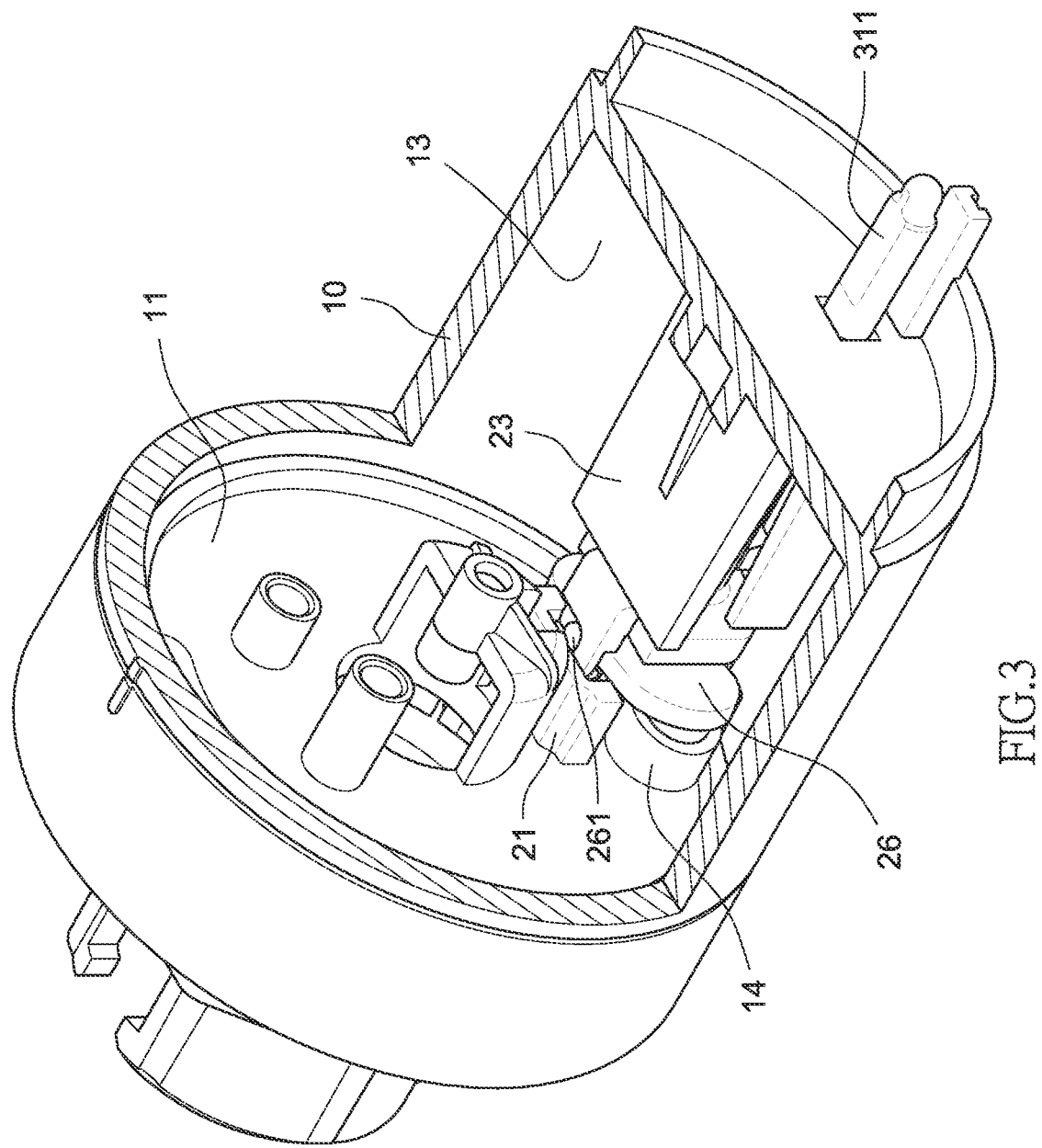
FIG. 3 is a schematic perspective cross-sectional view of FIG. 1.
Figure 4:
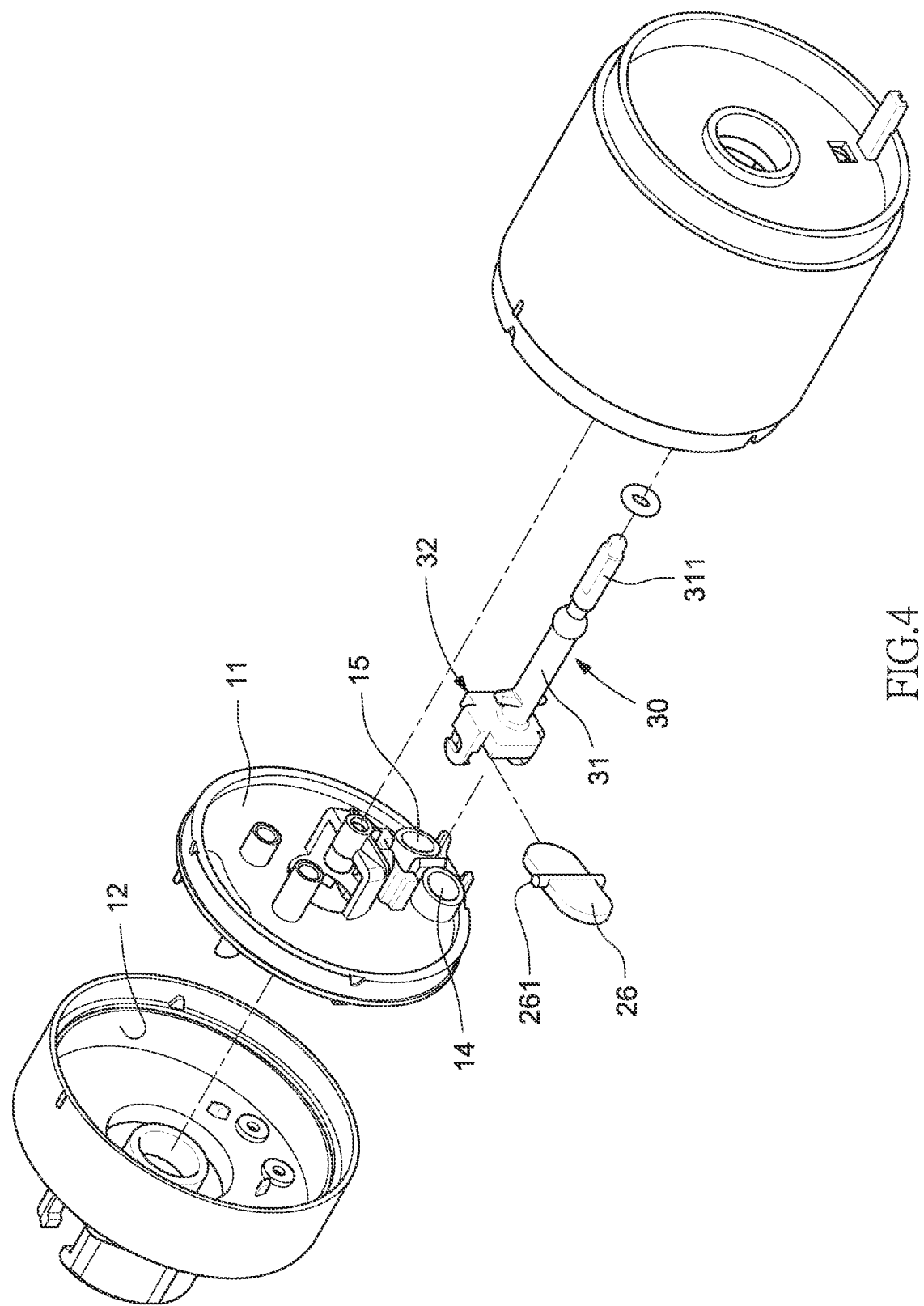
FIG. 4 is a schematic exploded view of FIG. 1 from a first perspective.

As shown in FIGS. 2 to 4, the movable seat 10 has been divided into an impeller chamber 12 and a gear chamber 13 by an internal partition 11, the partition 11 contains a first water channel 14 and a second water channel 15 which are connected with both of the impeller chamber 12 and the gear chamber 13.

The water flow switching device of the present invention includes a first receiving seat 21, a second receiving seat 22, a first pivot seat 23, a second pivot seat 24, a projection member a seesaw plate 26, and a driving lever 30.

Figure 6:
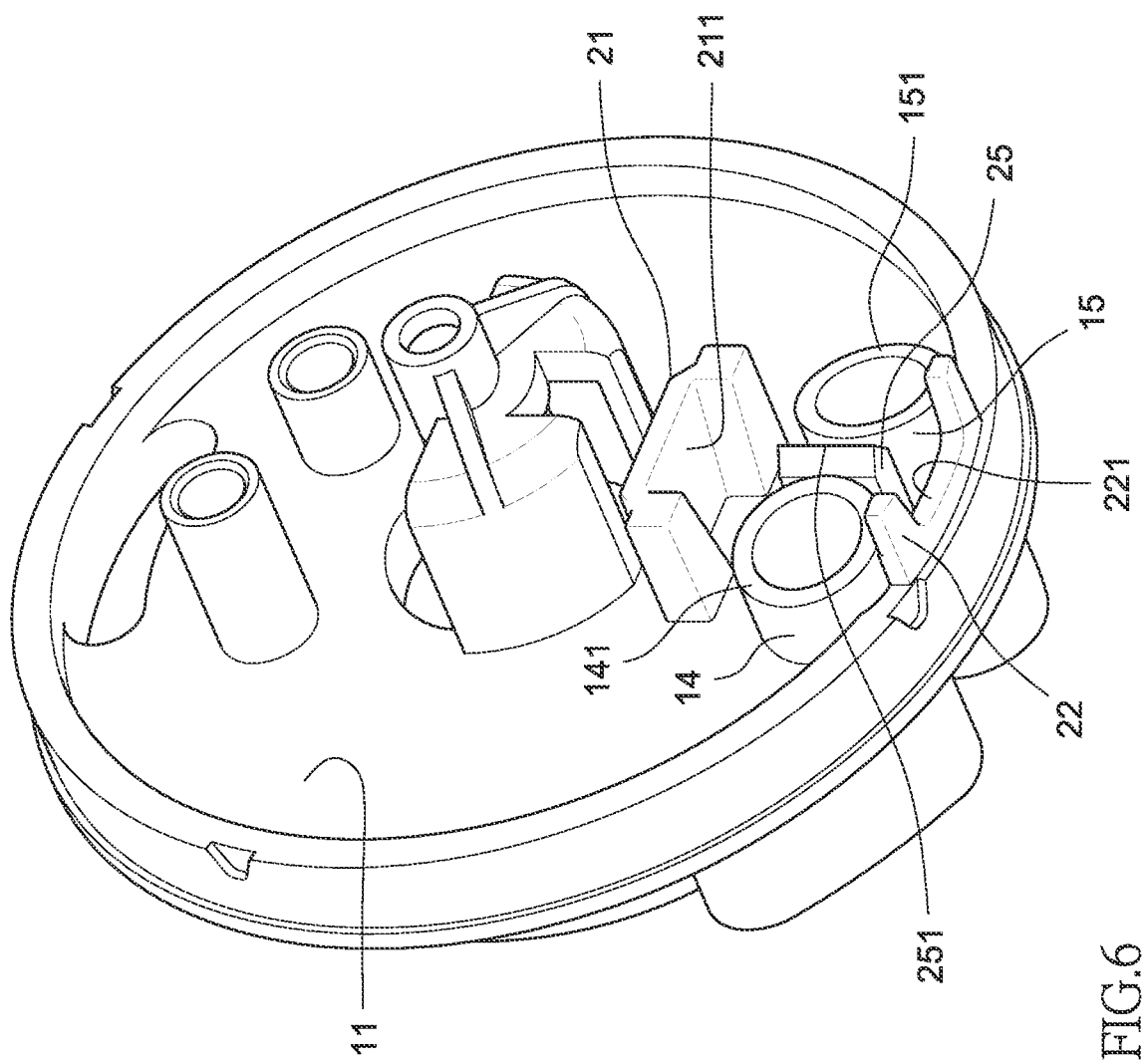
FIG. 6 is a schematic view of a partition seat and its components in FIG. 4.

The first receiving seat 21 and the second receiving seat 22, as shown in FIG. 6, are installed on the partition 11, symmetrically located on the both sides of the first water channel 14 and second water channel 15. The first receiving seat 21 has a receiving groove 211, and the second receiving seat 22 has a rounded concave supporting surface 221.

Figure 7:
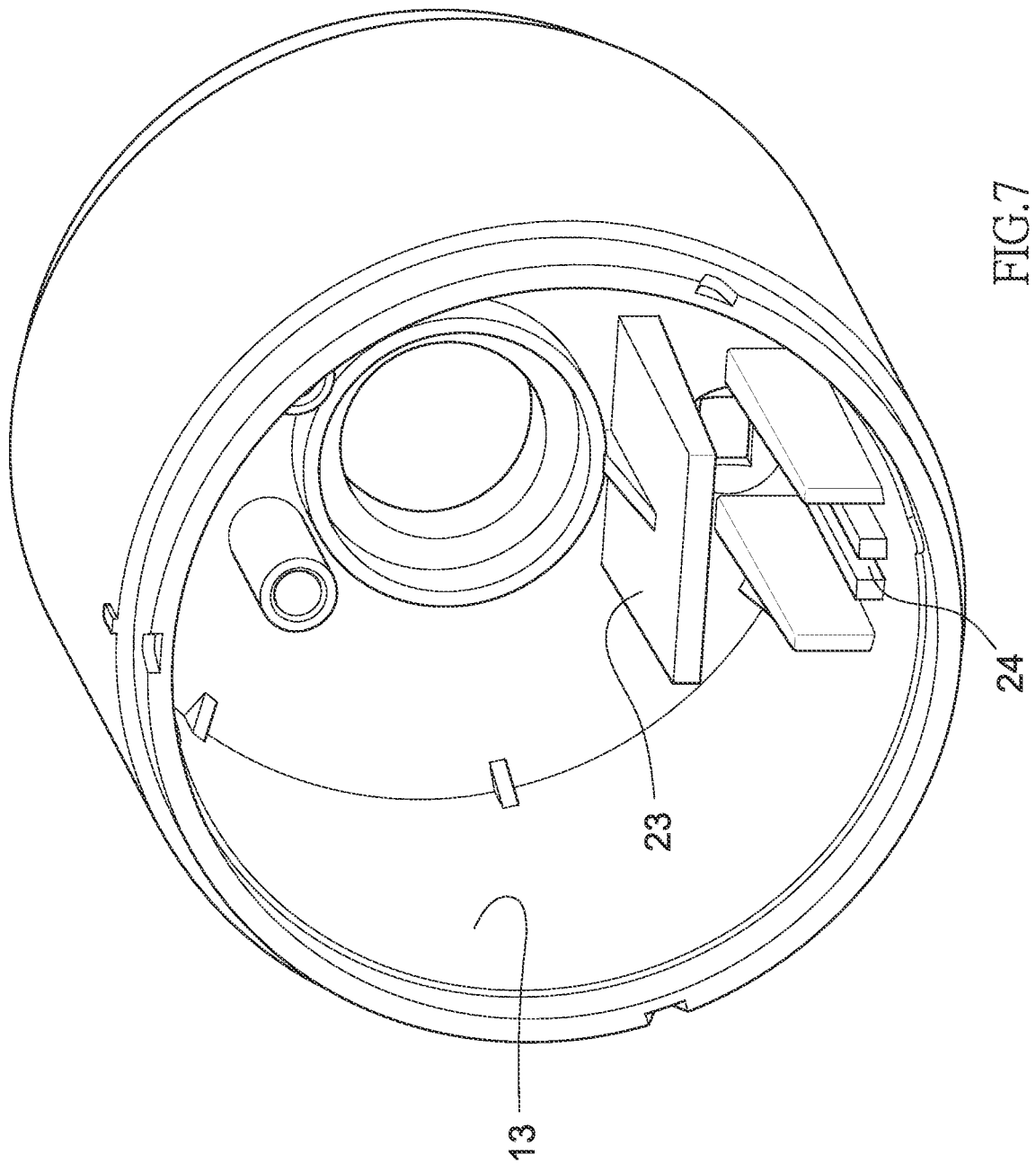
FIG. 7 is a schematic view of a movable seat and its components in FIG. 4.

The first pivot seat 23 and the second pivot seat 24, as shown in FIG. 7, are installed on the inner wall of the gear chamber 13 to assemble with the corresponding first pivot seat 21 and the second pivot seat 22.

Figure 10:
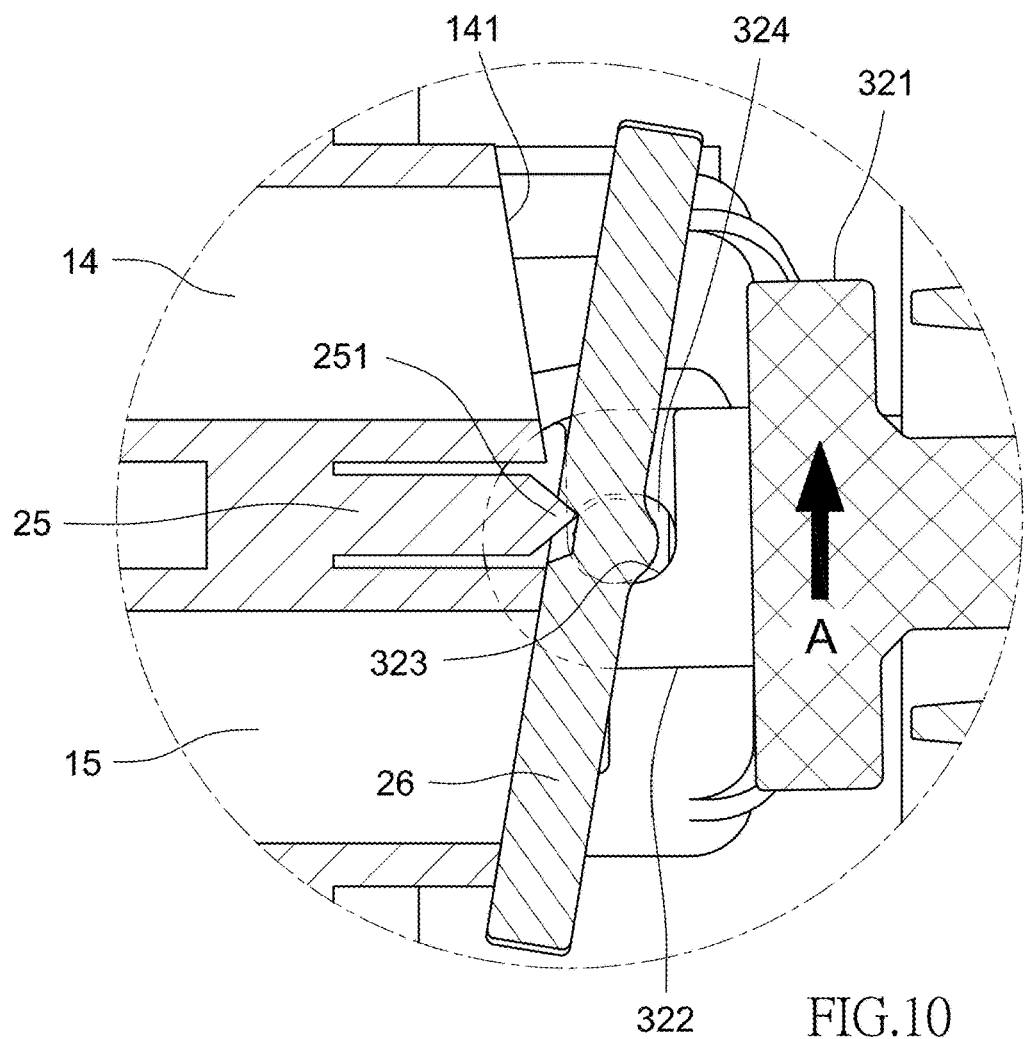
FIG. 10 is an enlarged view of the circle part of FIG. 9.

The projection member 25, as shown in FIG. 6 and FIG. 10, is disposed on the partition 11 and is located between the first water channel 14 and the second water channel 15. The top end of the projection member 25 includes a pivot tip 251.

Figure 8:
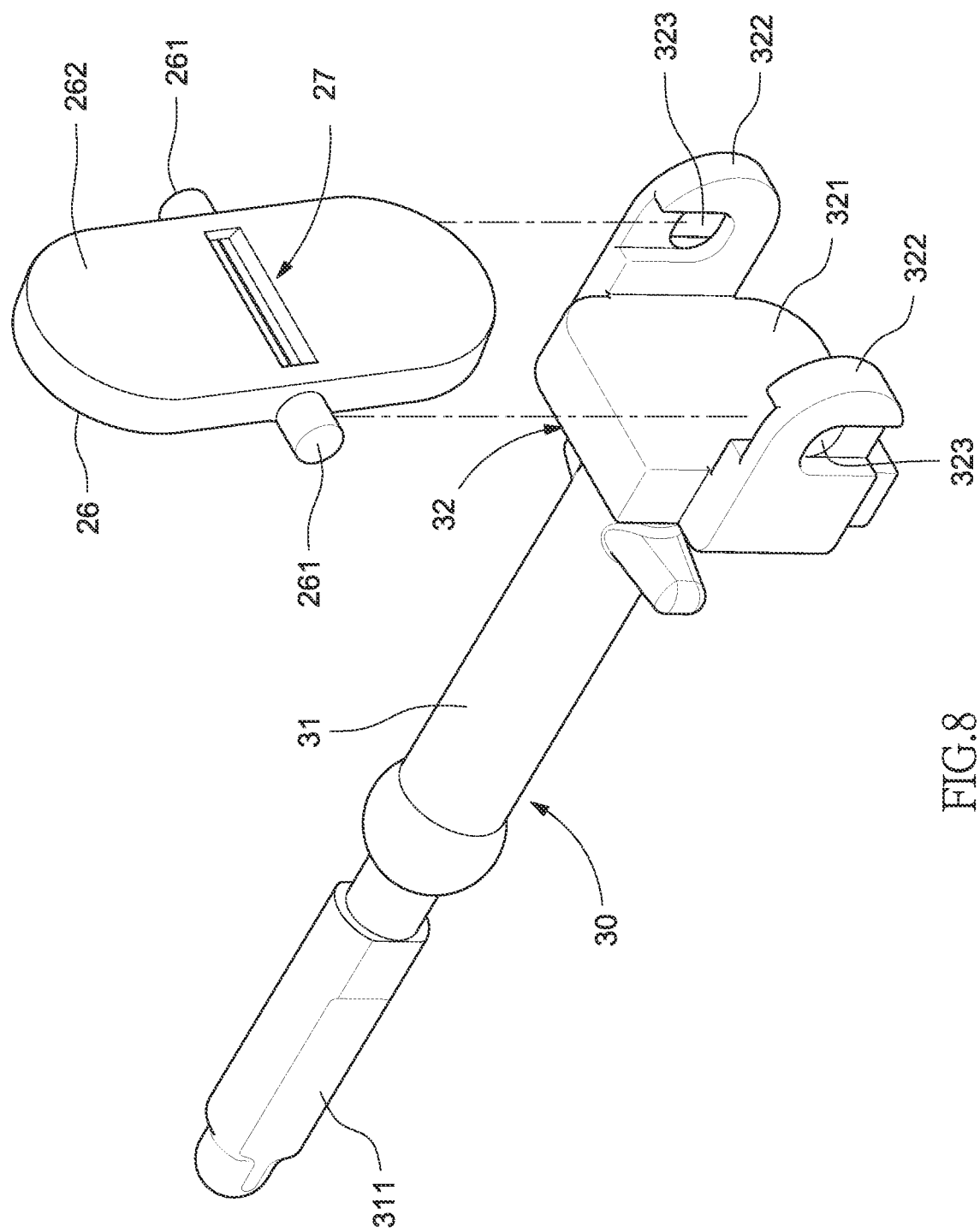
FIG. 8 is a schematic view of a driving lever and a seesaw plate in FIG. 4.
Figure 11:
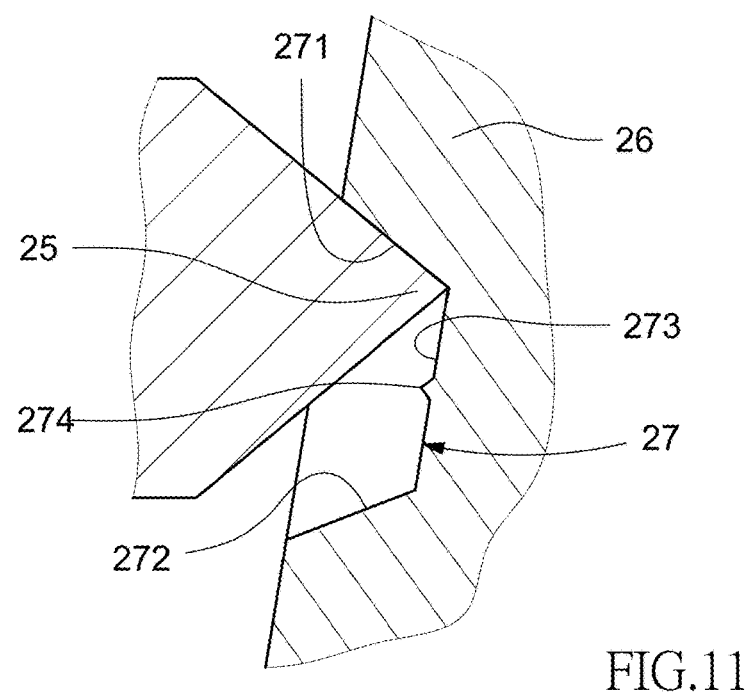
FIG. 11 is a, partially enlarged view of FIG. 10.

The seesaw plate 26, as shown in FIG. 8, is provided with a pivot 261 at the middle of each side, which is pivoted on a pivot portion 32 of the driving lever 30. Corresponding to the water inlet sections 141 and 151 of the first water channel 14 and the second water channel 15, the seesaw plate 26 can be acted like a seesaw through the control of the driving lever 30, and selectively closed the water inlet section 141 or 151 of the first water channel 14 or the second water channel 15. The surface of the seesaw plate 26 relatives to the inlet sections 141 and 151 is defined as a blocking surface 262, which is provided with a groove 27 in the middle, as shown in FIG. 11, mainly consists of a first sidewall 271, a second sidewall 272, and a bottom wall 273 which is connected between the first sidewall 271 and the second sidewall 272, and a rib 274 is provided in the middle of the bottom wall 273. Moreover, the pivot tip 251 of the projecting member 25 is placed in the groove 27.

Figure 5:
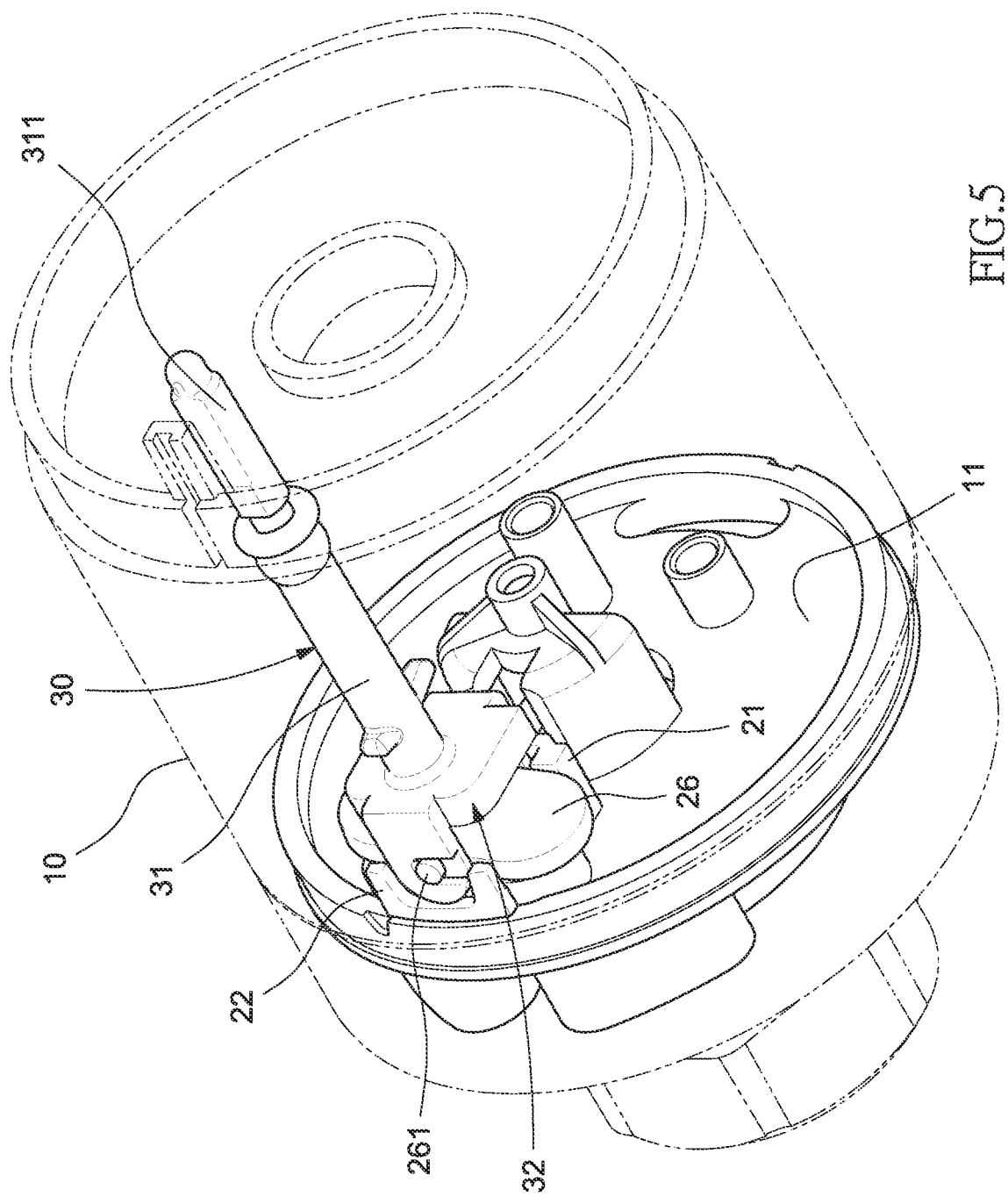
FIG. 5 is a schematic assembled view of FIG. 4 from a second perspective.

The driving lever 30, as shown in FIG. 8, includes a rod 31 and a pivot portion 32. The rod 31 is configured between the first pivot seat 23 and the second pivot seat 24 (as shown in FIGS. 2 and 3), an outer end 311 of the rod 31 extends outside of the movable seat 10 (as shown in FIGS. 1 to 5), and an inner end of the rod 31 is connected to the pivot portion 32. The pivot portion 32 includes a base 321 and two pivot lugs 322 which extend from the two lateral sides of the base 321 toward the pivot 261 of the seesaw plate 26. Each of the two pivot lugs 322 provides with a pivot hole 323 for the pivot 261 of the seesaw plate 26 to extend through (e.g., FIGS. 2, 3 and 5). The diameter of the pivot hole 323 is slightly larger thane outer diameter of the pivot 261 (FIG. 10), so there is a gap 324 in between the pivot 261 and the inner wall of the pivot hole 323 (as shown FIG. 10), accordingly, the pivot 261 is slightly loose in the pivot hole 323. The two pivot lugs 322 are connected to the pivot 261, as shown in FIGS. 3 and 5, with one of them penetrating into the receiving groove 211 of the first receiving seat 21, and the other one being supported by the supporting surface 221 of the second receiving seat 22. In the illustration, the edge of the pivot lug 322 is convexly rounded and is precisely caught by the concave rounded shape of the supporting surface 221, and the size of the receiving groove 211 is slightly larger than that of the pivot lug 322, so that the pivot lugs 322 can be rotary oscillated in the receiving groove 211 and on the supporting surface 221 due to the oscillation of the driving lever 30.

The features of the above-mentioned water flow switching device are further explained as follows:

The movable seat 10 can be assembled with the water inlet connector at one end to connect with the water source, and its other end can be connected with the sprinkler pipe. So, when the water enters the gear chamber 13 through the first water channel 14 or the second water channel 15, continuously enters the impeller chamber 12, which can drive the impeller housed therein to rotate, synchronously actuate the gear assembly housed in the gear chamber 13 to act, further draw the movable seat 10 to rotate. For better understanding the structures, please refer to the prior art and FIGS. 20 to 22.

The outer end 311 of the driving lever 30 which is exposed outside the movable seat 10, is toggled when the movable base 10 is rotated to a predetermined angle (described in the prior art previously), causing the pivot portion 32 of the driving lever 30 to generate a slight oscillation, which in turn drives the seesaw plate 26 to seesaw and selectively close the water inlet sections 141,151 of the first water channel 14 or the second water channel 15 to achieve the purpose of switching the water flow.

Figure 9:
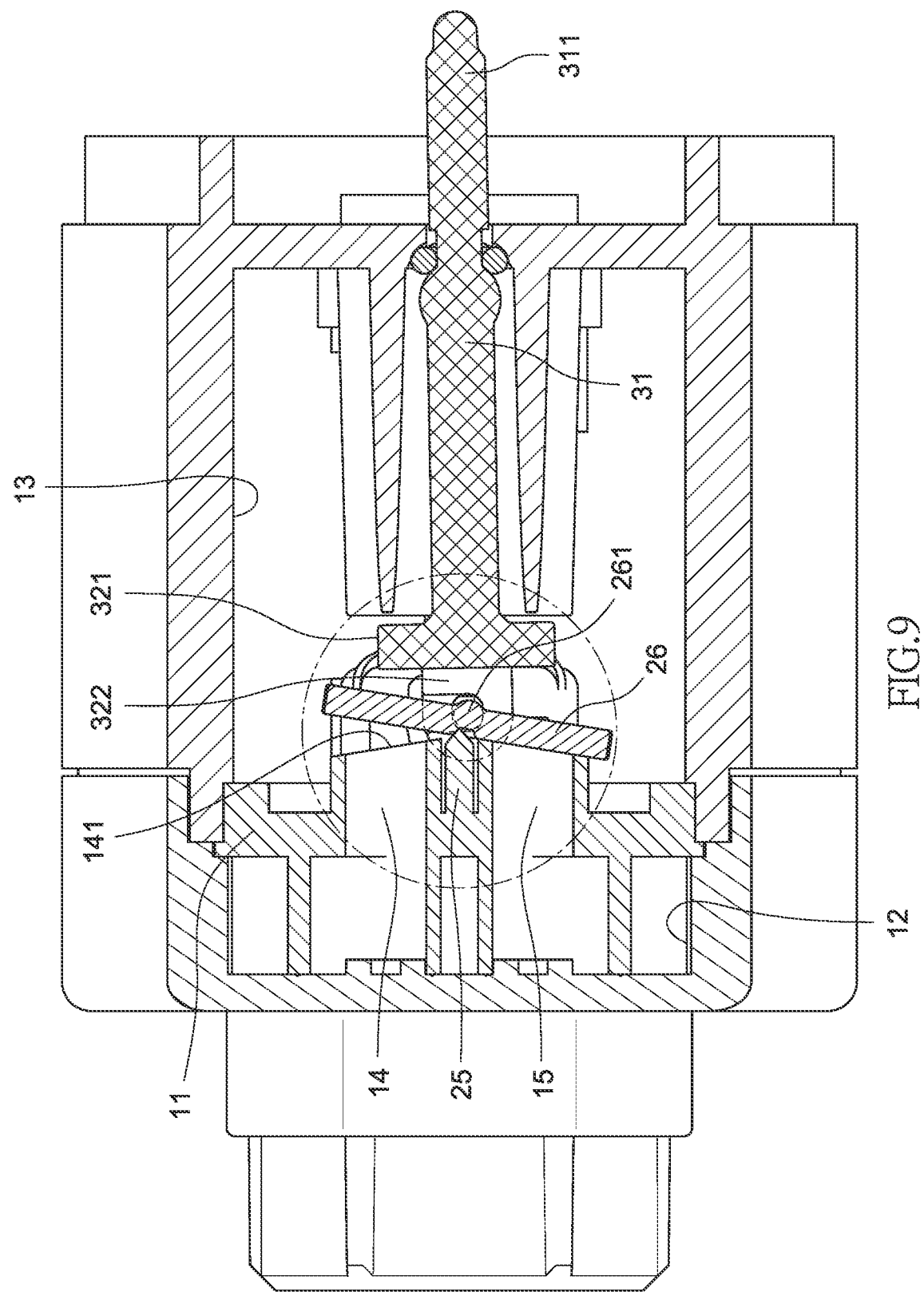
FIG. 9 is a cross-sectional view taken along line IX-IX of FIG. 2.

As shown in FIGS. 9 to 11, the pivot tip 251 of the projection member 25 leans against the first sidewall 271 of the groove 27. The pivot tip 251 is similar to a pivot point of the seesaw plate 26, and the pivot point is not at the center of the seesaw 26, but is biased toward the first water channel 14, according to the relationship between the pivot point position and the length of the lever arm in the lever principle, the seesaw plate 26 will tilt toward the second water channel 15 and further close the inlet section 151 of the second water channel 15.

Figure 12:
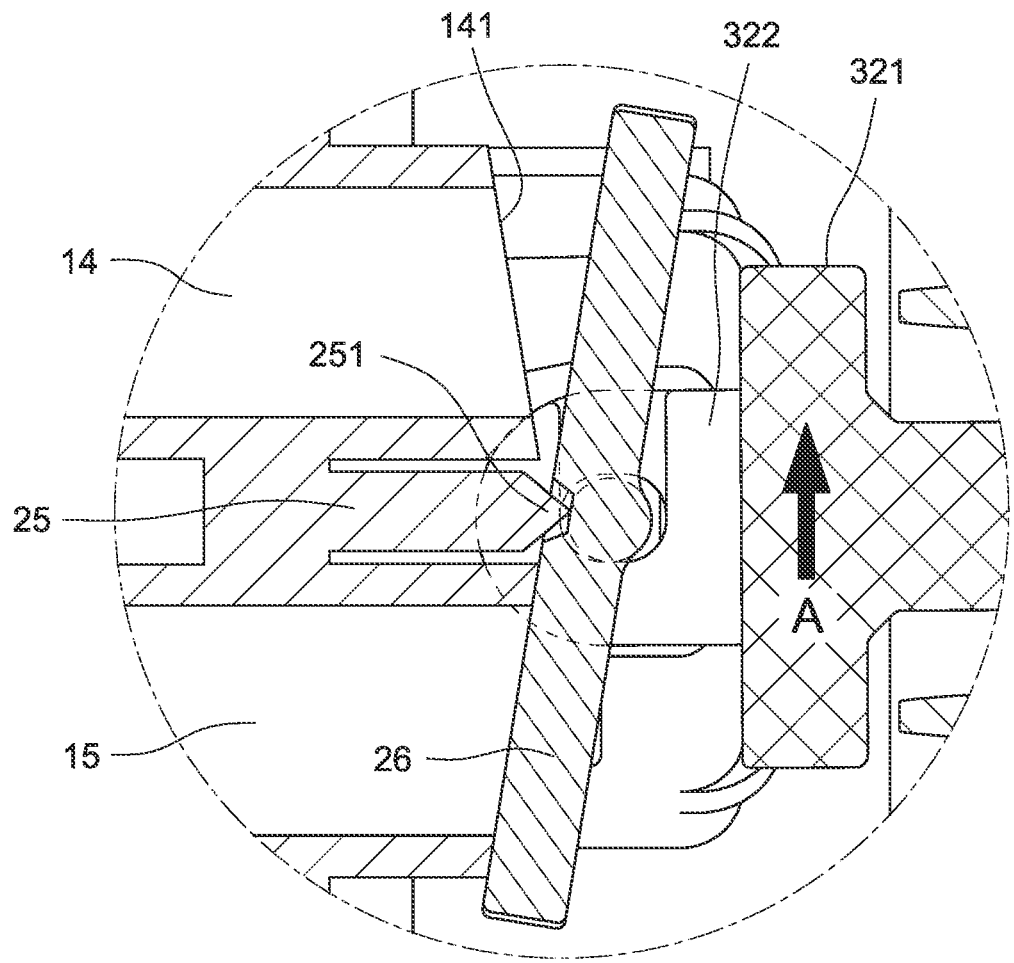
FIG. 12 is a schematic view for continuously describing the seesaw plate action along with FIG. 10.
Figure 13:
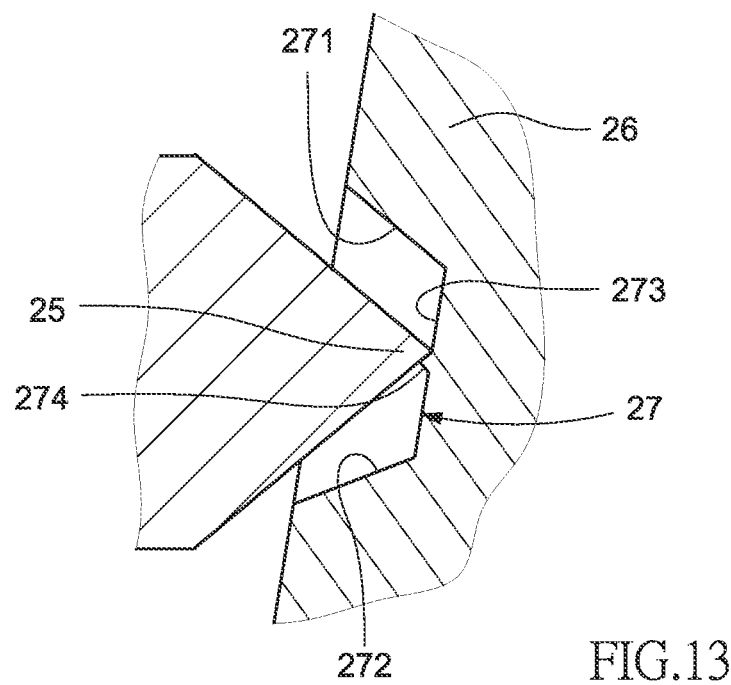
FIG. 13 is a partially enlarged view of FIG. 12.

As shown in FIGS. 12 and 13, the pivot portion 32 moves in the direction of the arrow A due to the driving lever 30 being toggled, and the pivot lugs 322 drive the seesaw 26 to move in the direction of the arrow A during the process as well, as a result, the groove 27 would be displaced on the pivot tip 251.

Figure 14:
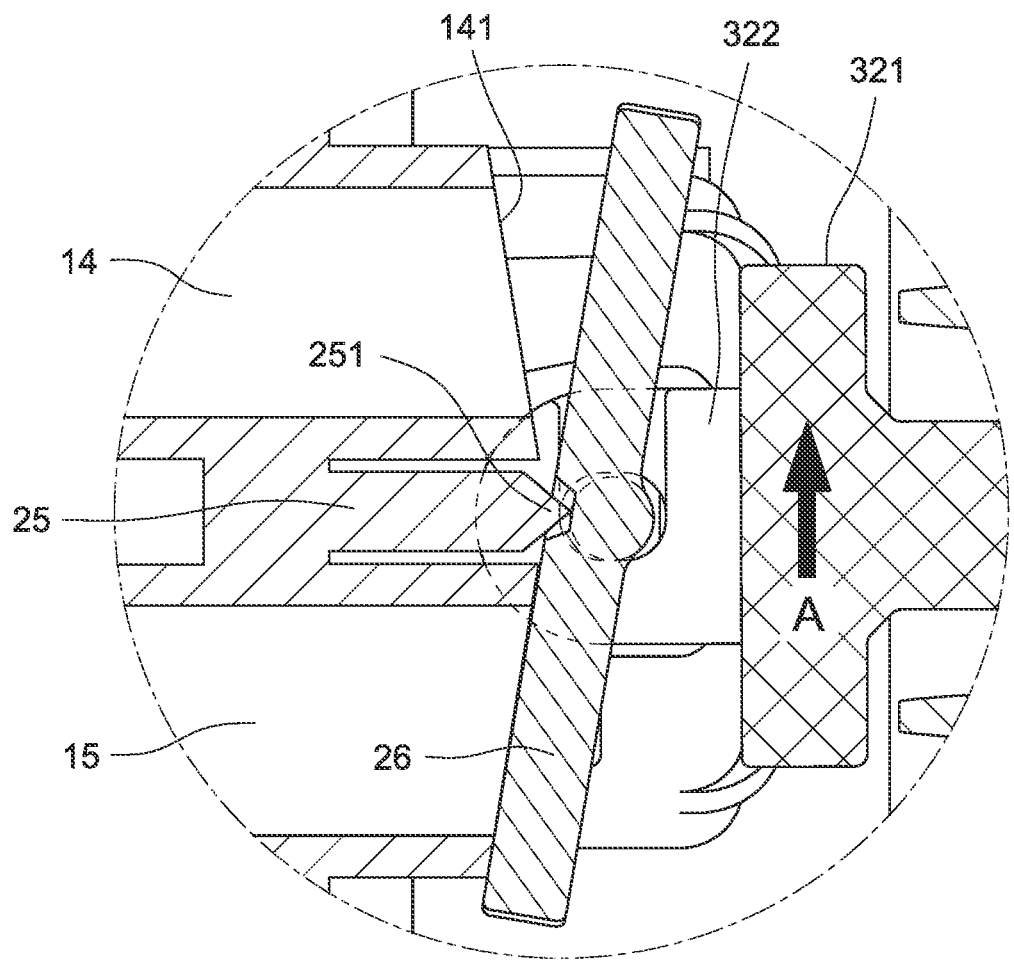
FIG. 14 is a schematic view for continuously describing the seesaw plate action along with FIG. 12.
Figure 15:
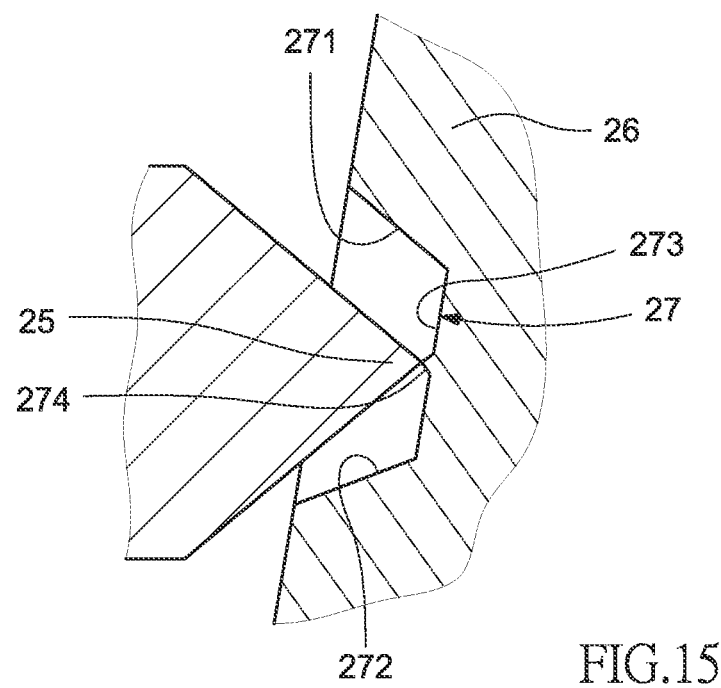
FIG. 15 is a partially enlarged view of FIG. 14.

As shown in FIGS. 14 and 15, the pivot tip 251 of the projection member 25 touches with the rib 274. Because the pivot 261 is slightly loose in the pivot hole 323 (as described previously), when the groove 27 is displaced over the pivot tip 251, the rib 274 will cross over the pivot tip 251, at which the pivot point will start to bias toward the second water channel 15.

Figure 16:
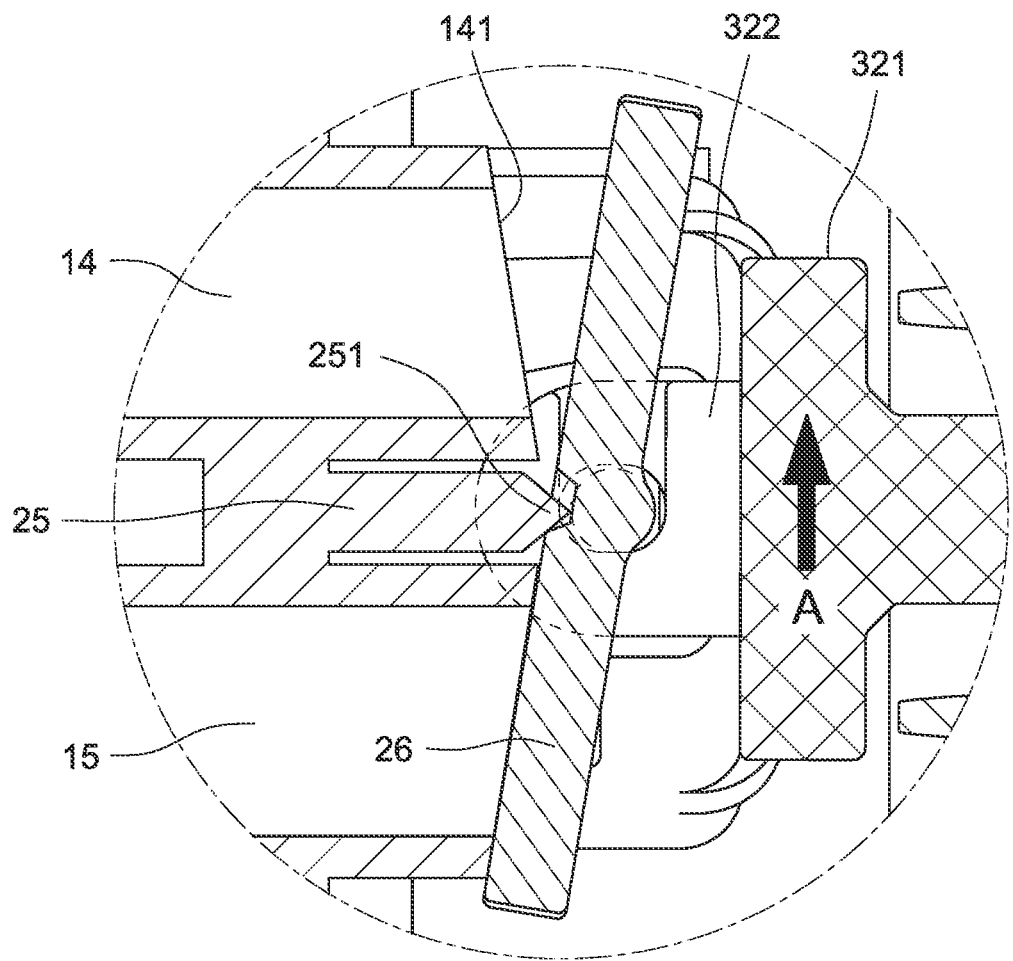
FIG. 16 is a schematic view for continuously describing the seesaw plate action along with FIG. 14.
Figure 17:
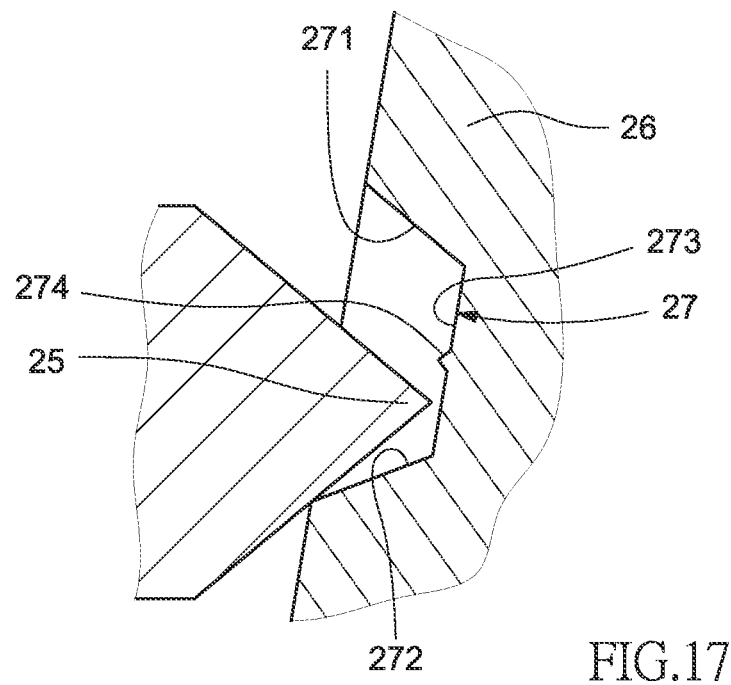
FIG. 17 is a partially enlarged view of FIG. 16.

As shown in FIGS. 16 and 17, when the seesaw plate 26 continues to move in the direction of the arrow A, and the groove 27 will keep moving on the pivot tip 251 as well, as a result, the pivot point will be more biased toward the second water channel 15.

Figure 18:
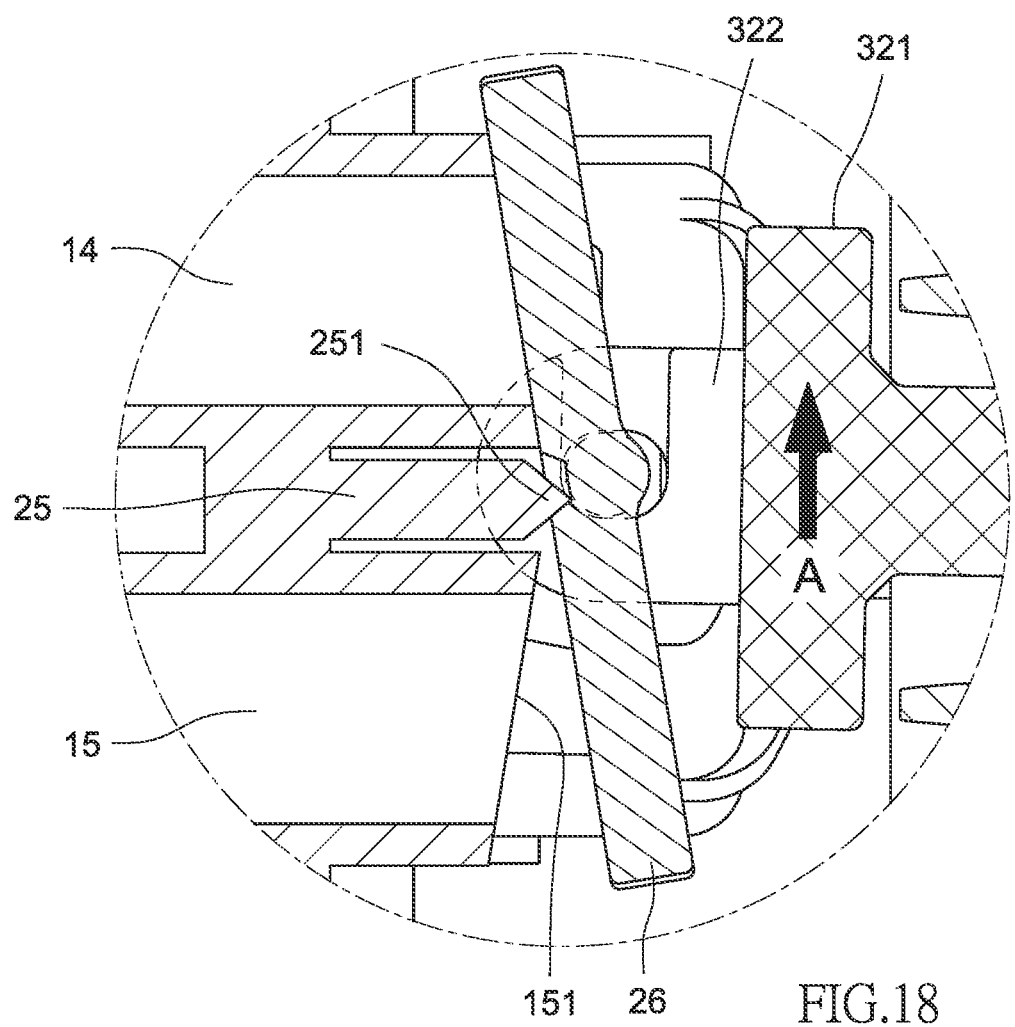
FIG. 18 is a schematic view for continuously describing the seesaw plate action along with FIG. 16.
Figure 19:
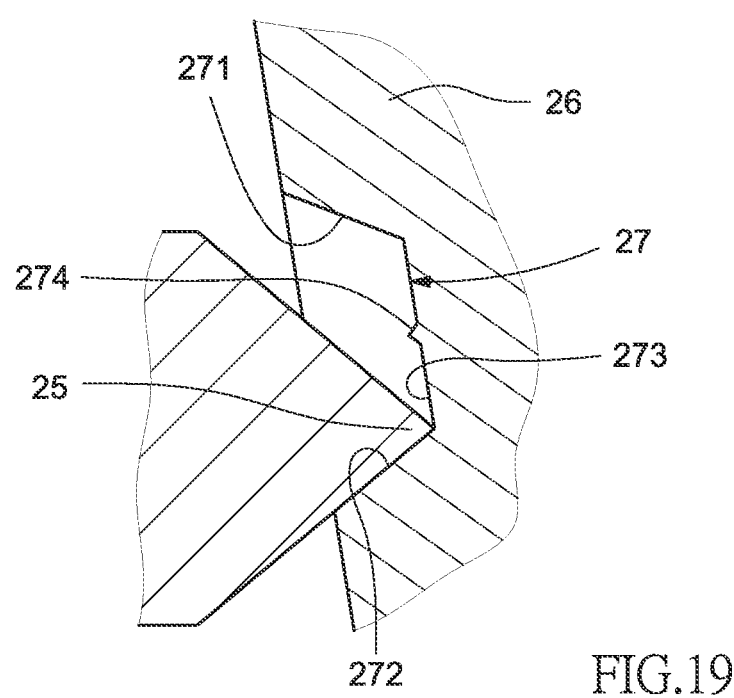
FIG. 19 is a partially enlarged view of FIG. 18.

As in FIGS. 18 and 19, showing the pivot tip 251 leans toward the second sidewall 272 of the groove 27. According to the lever principle, when the pivot point is biased toward the second water channel 15, the seesaw plate 26 will tilt toward the first water channel 14 and further close the inlet section 141 of the first water channel 14.

In summary, when the driving lever 30 is toggled, the seesaw plate 26 will be displaced along with the oscillation of the pivot portion 32, and the corresponding position of the pivot tip 251 will be changed accordingly, resulting in the change of the pivot point and the length of the lever arm, thus causing the seesaw plate 26 to generate a seesaw movement. In comparison with the driving lever 30, Changing the direction of the seesaw plate 26 saves much energy and it will closely seal the inlet section of one of the water channels, in other words, the inlet section of the other water channel will be completely open, therefore, there will be no flow disturbance of the inlet section for the first water channel 14 and the second water channel 15 that caused by a semi-opening status of two inlet sections at the same time.

What is claimed is:

1. A sprinkler water flow switching device assembled in a movable seat of a water sprinkler, the movable seat internally divided by a partition into an impeller chamber and a gear chamber, the partition having a first water channel and a second water channel connecting the impeller chamber and the gear chamber; the sprinkler water flow switching device comprising:
   a projection member provided on the partition and located between the first water channel and the second water channel;
   a seesaw plate having a pivot at the middle of two lateral sides thereof, the seesaw plate located at a position corresponding to inlet sections of the first water channel and the second water channel, and a surface of the seesaw plate facing the inlet sections being defined as a blocking surface, the blocking surface having a groove at the middle thereof, the groove comprising a first sidewall, a second sidewall and a bottom wall which is connected between the first sidewall and the second sidewall, wherein a top end of the projection member is positioned in the groove; and
   a driving lever comprising a rod and a pivot portion, the rod is configured to oscillate in an extended and restricted manner in the gear chamber, the pivot portion is disposed on an end of the rod corresponding to the seesaw plate, the pivot portion is provided with two pivot holes, and opposing ends of the pivot of the seesaw plate are respectively pivoted in the two pivot holes;
   wherein oscillation of the driving lever actuates movement of the seesaw plate to displace its groove on the projecting member such that when the first side wall or the second side wall is leaned against the top end of the projection member, the top end of the projection member will be supported at an eccentric position of the seesaw plate so that the seesaw plate can selectively close the inlet section of the first water channel or the inlet section of the second water channel with the blocking surface.

2. The sprinkler water flow switching device according to claim 1, wherein a rib is provided in the middle of the bottom wall and a pivot tip is formed on the top end of the projection member, and the diameter of each pivot hole is larger than the outer diameter of the pivot so that there is a gap between the pivot and an inner wall of each pivot hole.

3. The sprinkler water flow switching device according to claim 1, wherein the pivot portion comprises a base and two pivot lugs which are symmetrically and respectively connected with opposing sides of the base, and each of the pivot lugs has a respective one of the pivot holes.

4. The sprinkler water flow switching device according to claim 3, further comprising a first receiving seat and a second receiving seat provided on the partition and symmetrically installed on opposing sides of the first water channel and the second water channel;
   wherein the first receiving seat has a receiving groove and the second receiving seat has a supporting surface in a rounded concave shape;
   wherein one of the pivot lugs is extended into the receiving groove, and the other of the pivot lugs is supported by the supporting surface.

* * * * *